March 30, 1937.　　I. G. QUESADA　　2,075,467

VALVE OPERATING MECHANISM

Filed Jan. 4, 1934

INVENTOR

Irving G. Quesada

Patented Mar. 30, 1937

2,075,467

UNITED STATES PATENT OFFICE 2,075,467

VALVE OPERATING MECHANISM

Irving G. Quesada, Washington, D. C., assignor to National Machine Products Company, Detroit, Mich., a corporation of Michigan Application January 4, 1934, Serial No. 705,297

15 Claims. (Cl. 123—90)

This invention relates to tappets for use in internal combustion engines.

Briefly, the invention looks to the provision of a tappet in which the tappet screw is held in an adjusted position without the aid of the external jam nut ordinarily employed for this purpose and it will be found that the tensioning or locking means for the screw is effective during actual adjustment of the screw, by reason of which there is avoided the possibility that the adjustment of the screw may be disturbed by later bringing into play a screw locking or tensioning means.

Another attribute of the invention has to do with the mounting of the screw and the locking means therefor within the tappet body in a manner providing for the relatively quick and easy removal of these parts without disturbing the tappet body.

Also, it will be found that in one of the disclosed forms of the invention, the tensioning or locking means for the tappet screw acts in the same direction as the load incident to intermittent valve actuation so as to avoid backlash and rapid wear between the various interfitting threads of the tappet, and to provide for accurate adjustment.

More particularly, the invention contemplates a tappet in which the shank of the tappet screw is formed with separate attaching and locking threads of different pitch, to mate with the complemental threads of attaching and locking elements, with a spring washer or other power element so mounted with respect to these parts that coincident with the advancement of the tappet screw to its working field or range, the differential between the attaching and locking threads will have the effect of loading the spring washer or other power element for subsequent action in holding the tappet against accidental shifting.

With further reference to the difference in pitch between the two sets of threads on the shank of the tappet screw, it is pointed out that such difference has the effect of steadying and restraining the tappet screw in its mounting against the contrary influences known to accompany the use of the tappet.

Other objects and advantages will be apparent during the course of the following description.

Figure 1:
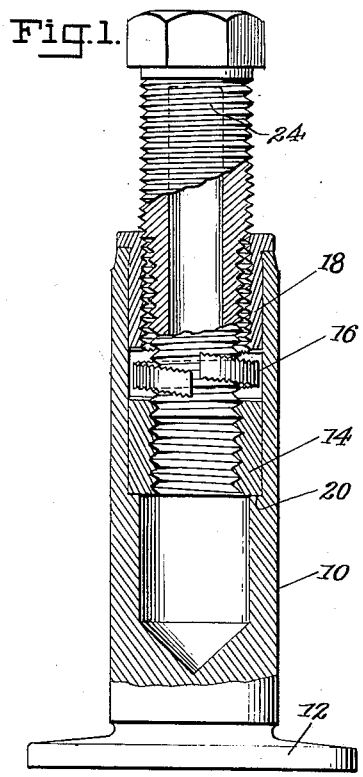
Figure 2:
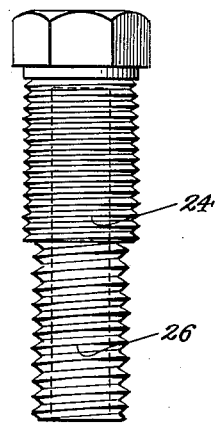
Figure 3:
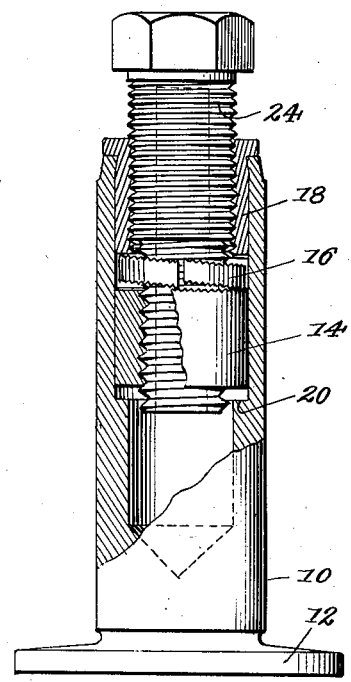
Figure 4:
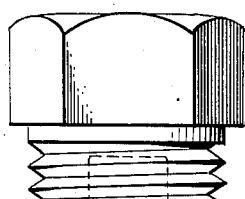
Figure 5:
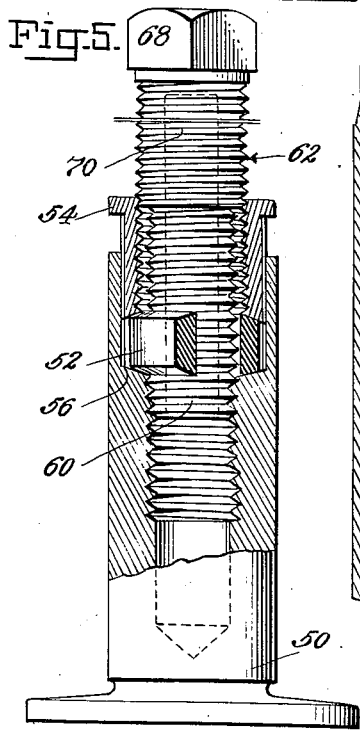
Figure 6:
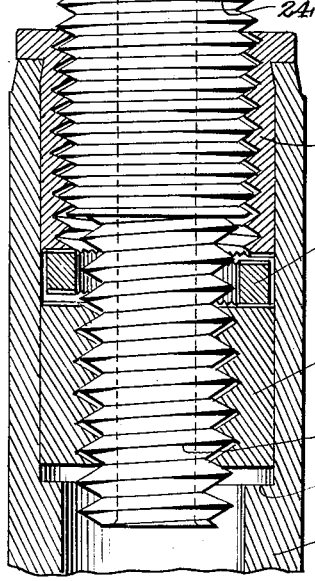
Figure 6:
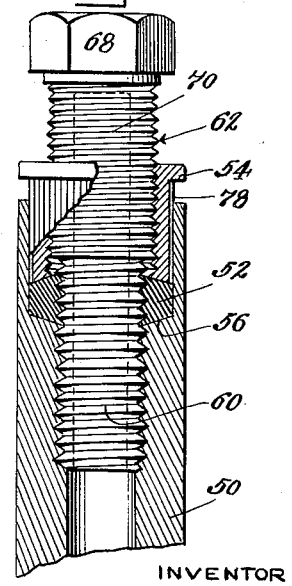

In the accompanying drawing, forming a part of this application and in which like numerals are employed to designate like parts throughout the same, Figure 1 is a vertical sectional view through the improved tappet with the tappet screw in position to be advanced to its operative field or range, a portion of the tappet being shown in elevation, Figure 2 is a side elevation of a tappet screw embodied in the invention, Figure 3 is a vertical sectional view through the improved tappet with the tappet screw advanced to its operative field or range, a portion of the tappet being shown in elevation, Figure 4 is an enlarged fragmentary vertical sectional view through the improved tappet, Figure 5 is a vertical sectional view through a modified form of tappet with the tappet screw in position to be advanced to its operative range, Figure 6 is a fragmentary vertical sectional view through the modified form of tappet with the tappet screw advanced to its operative field or range.

In the drawing, and more particularly Figures 1, 2, 3, and 4, the numeral 10 designates the tappet body having suitable means such, for example, as a mushroom base 12 for engagement by one of the lobes of a crank shaft through the medium of which the body and parts carried thereby are actuated.

It is illustrated that the bore of the body 10 is enlarged diametrically from a point between the ends thereof to the upper or outer end thereof for the reception of a restraining abutment nut or element 14, a tensioning or power element 16 and an attaching ferrule, bushing or element 18.

The parts 14, 16, and 18 are arranged end to end in substantial alignment, with the nut 14 initially resting upon the internal shoulder 20 while the bushing 18 is pressed or otherwise rigidly secured in place in the outer portion of the bore of the body 10 making the bushing a fixed portion of the body 10.

The tensioning element 16 is shown in the form of a split helical spring washer and is arranged between the opposed spaced ends of the elements 14 and 18 with the dimensions of the parts such that when the bushing 18 is secured in place the element 16 will be slightly loaded thereby holding the nut 14 yieldingly upon its seat and against rotation.

The bearing surfaces of the tensioning element 16 and the opposed surfaces of the elements 14 and 18 are provided with complemental radial or other serrations cooperating with each other and the power element 16 in holding the element 14 against turning in the body 10.

Attention is now invited to Figure 2 in which there is illustrated a motion transmitting tappet screw having a shank provided with attaching threads 24 and tensioning or locking threads 26, the threads 26 being at the end portion of the shank removed from the impact head of the screw and being of a pitch coarser or greater than that of the attaching threads 24. It is believed to be apparent that the tensioning threads 26 are intended to interfit with the complemental threads of the restraining nut 14, while the somewhat finer threads 24 interfit with the internal threads of the bushing or ferrule 18.

The mounting of the tappet screw as shown in Figure 1 and the advancement of the same to its field of adjustment as shown in Figure 3 will bring about the lifting of the element 14 a distance approximating the differential between the threads 24 and 26. With the element 14 thus lifted from its seat 20, the power spring 16 is compressed or loaded to a value where the tappet screw is securely held against accidental shifting under the influence of vibration, intermittent valve actuation and other contrary influences, while at the same time allowing the screw to be adjusted with the aid of a suitable wrench. Since the screw restraining arrangement is effective during actual adjustment of the screw, there is no possibility that the adjustment of the screw will be disturbed by later bringing into play a jam nut or other screw locking means as is the case with tappets now in use.

It is known to those acquainted with this art that the load incident to intermittent valve actuation is in the direction of the base 12 or its equivalent. In this connection, attention is invited to Figure 4, from which it may be seen that the screw tensioning arrangement herein disclosed acts in the same direction as the load due to valve actuation. More specifically, the load incident to intermittent valve actuation is transmitted through the abutting lower flanks of the threads 24 and the upper flanks of the threads of the bushing 18. The herein disclosed tensioning or locking means for the tappet screw maintains this contact between the threads 24 and the complemental threads of the bushing 18. In explaining this, it is pointed out that the spring 16 acts expansively to urge the nut 14 and the screw inward or in the direction of the base 12. Thus, the screw is subjected to a pulling force acting in the same direction as the load due to valve actuation.

Since the major loading of the tensioning element 16 occurs as an incident to the advancement of the tappet screw to an operative field or range and is dependent upon the differential between the two sets of threads on the shank of the screw, it will be seen that even though the establishment of proper clearance between the impact head and the associated valve stem requires that the tappet screw be retracted possibly twenty or thirty thousandths of an inch, the resulting relaxation on the tensioning element 16 will be insufficient to destroy the effectiveness of the tensioning element.

The differential between the two sets of threads on the shank of the tappet screw has a definitely steadying and restraining effect on the screw. This steadying and restraining force acts in concert with the tensioning mechanism in maintaining the tappet screw in adjustment. In addition, the screw engaging nut 14 is closely embraced by the body 10 and this further assists in steadying the screw. Also, as shown in Figure 3, the elements 14 and 18 have close interfitting and embracing relation with the shank of the screw for a very substantial portion of its length and in this manner provides a firm mounting for the screw.

The diameter of that portion of the screw shank having the threads 26 is shown to be somewhat less than the diameter of the remaining portion of the shank to permit of the installation and removal of the screw. In this connection, attention might be invited to the fact that the arrangement of the various parts is such that the screw and the elements 14, 16 and 18 may be removed with convenience for replacement or other purposes without disturbing the body 10 in its guide.

In the form of invention shown in Figures 5 and 6, the tappet body 50 has the bore thereof diametrically enlarged from a point between the ends thereof to the upper or outer end thereof for the accommodation of a tensioning or power element 52 and a restraining element or nut 54. The diametrical enlargement of the bore of the tappet body defines an annular seat 56 for the tensioning element 52. The tensioning element 52 is of a yieldable elastic material having the power of recovery and may be in the nature of a body of lively rubber, fiber, or spring metal.

The lower or inner portion of the bore of the body 50 is formed with screw threads to mate with the complemental threads 60 on what might be said to be the lower or inner portion of the shank 62 of the tappet screw.

That portion of the shank 62 between the threads 60 and the impact head 68 has screw threads 70 of a pitch somewhat finer than the threads 60 and adapted to mate with the complemental threads of the nut 54.

That portion of the shank of the tappet screw having the threads 60 has a diameter somewhat less than the remaining portion of the shank of the screw to enable the shank to pass through the element 54. It is believed to be apparent that the advancement of the screw will, by reason of the relatively coarser pitch of the threads 60, bring about the compression of the tensioning element 52 so that there is placed upon the screw an endwise thrust sufficient to resist shifting of the screw while at the same time allowing the screw to be turned with the aid of an open end or other wrench.

Coincident with the advancement of the tappet screw to its intended field of adjustment, there is an increase in the pressure and hence the friction between the members 52 and 54 by which the member 54 is held against turning. In addition, the element 54 and the opposed surface of the bore of the body 50 are formed with interfitting longitudinal serrations 78 holding the nut against turning.

It is illustrated in Figure 6 that the seat 56 and the opposed end of the element 54 are inclined transversely in opposite directions so that when the yieldable body 52 of rubber or the like is placed under pressure, it will be pressed inward into firm restraining and steadying contact with the shank of the tappet screw.

Having thus described the invention, what is claimed is:—

1. In a tappet for intermittently actuating the poppet valve of an internal combustion engine, a body having a longitudinal bore provided with a shoulder, a locking element initially resting on said shoulder and having threads, a threaded attaching element in said bore in longitudinally spaced relation to said locking element, an expansion lock washer between said locking and attaching elements and a motion transmitting tappet screw having a shank extending longitudinally into said bore and provided with attaching threads interlocking with said attaching element to render the tappet screw adjustable longitudinally of the body, said shank being provided with a second set of threads of a pitch coarser than said first named set of threads and mating with the threads of the locking element, said lock washer being provided with serrations for engaging said locking element.

2. In a tappet for intermittently actuating the poppet valve of an internal combustion engine, a body having a bore provided with a shoulder, a threaded locking element initially resting on said shoulder, a threaded attaching element in said bore in longitudinally spaced relation to said locking element, an expansion element between said locking and attaching elements and initially compressed thereby, and a motion transmitting tappet screw having a shank provided with attaching threads interlocking with the threads of said attaching element thereby rendering the tappet screw adjustable with respect to the body, said shank being provided with a second set of threads of a pitch greater than that of said first named set of threads and mating with the threads of the locking element.

3. In a tappet for intermittently actuating the poppet valve of an internal combustion engine, a body having a longitudinal bore provided with a shoulder, a threaded locking element initially resting on said shoulder, a threaded attaching element in said bore, a power element between said locking and attaching elements, and a motion transmitting tappet screw having a shank extending longitudinally into said bore and provided with attaching threads interlocking with the threads of said attaching element to render the tappet screw adjustable longitudinally of the body, said shank being provided with a second set of threads of a pitch greater than the pitch of said first named set of threads and mating with the threads of the locking element.

4. In a tappet for intermittently actuating the poppet valve of an internal combustion engine, a body having a longitudinal bore, threaded attaching and locking elements in the bore of said body in longitudinal alignment, a power element between said attaching and locking elements and having an expansive force, and a motion transmitting tappet screw having a shank extending longitudinally into said bore and provided with attaching threads engaging the threads of said attaching element thereby rendering the tappet screw adjustable longitudinally of the body, said shank being provided with a second set of threads engaging the threads of said locking element and being of a pitch greater than the pitch of the attaching threads.

5. In a tappet for unseating the poppet valve of an internal combustion engine, a motion transmitting screw having a shank provided with attaching threads and with locking threads having a pitch different from the pitch of the attaching threads, an attaching element having threads engaged with the attaching threads of said shank, a locking element having threads engaged with the locking threads of the shank, a tensioning element loaded by the differential between the attaching and locking threads on the shank of said screw, said tensioning element being confined between said attaching and locking elements, and a support for said attaching element and being in closely embracing relation to said locking element to steady the same.

6. In a tappet for unseating the poppet valve of an internal combustion engine, a motion transmitting screw having a shank provided with attaching threads and with locking threads having a pitch different from the pitch of the attaching threads, an attaching element having threads engaged with the attaching threads of said shank, a locking element having threads engaged with the locking threads of the shank, a tensioning element loaded by the differential between the attaching and locking threads on the shank of said screw, said tensioning element being confined between said attaching and locking elements, and a support for said attaching element.

7. In a tappet for unseating the poppet valve of an internal combustion engine, a motion transmitting screw having a shank provided with attaching threads and with locking threads having a pitch different from the pitch of the attaching threads, an attaching element having threads engaged with the attaching threads of said shank, a locking element having threads engaged with the locking threads of the shank, and a tensioning element loaded by the differential between the attaching and locking threads on the shank of said screw, said tensioning element being confined between said attaching and locking elements.

8. In a tappet for unseating the poppet valve of an internal combustion engine, a motion transmitting screw having a shank provided with attaching threads and with locking threads having a pitch different from the pitch of the attaching threads, an attaching element having threads engaged with the attaching threads of said shank, a locking element having threads engaged with the locking threads of the shank, and a power element loaded by the differential between the attaching and locking threads on the shank of said body and being in operative relation to the attaching and locking elements.

9. In a tappet for intermittently unseating the poppet valve of an internal combustion engine, a body having a longitudinal bore formed with screw threads, a tappet screw having a shank extending longitudinally into said bore and provided with screw threads mating with and complemental to the first named screw threads, said shank being provided with a second set of screw threads of a pitch different from the first named screw threads of the shank, a restraining element having screw threads mating with the second named set of screw threads of the shank, and a resilient body engaged by said restraining element, said restraining body being provided with means to urge said resilient body into pressure contact with the tappet screw.

10. In a tappet for intermittently unseating the poppet valve of an internal combustion engine, a body having a bore formed with screw threads, a tappet screw having a shank provided with screw threads mating with and complemental to the first named screw threads, said shank being provided with a second set of screw threads of a pitch different from the first named screw threads of the shank, a restraining element having screw threads mating with the second named set of screw threads of the shank, and a resilient body engaged by said restraining element, said restraining body being provided with means to urge said resilient body into pressure contact with the tappet screw, said restraining element and said body being provided with cooperating means holding the restraining element against turning.

11. In a tappet for intermittent internal combustion engine valve actuation, a body having a portion provided with screw threads, a motion transmitting tappet screw having screw threads mating with said first-named screw threads to render the tappet screw adjustable longitudinally of the body, a restraining element associated with said motion transmitting tappet screw, said restraining element and said body being formed with interfitting screw threads of a pitch different from the pitch of said first-named screw threads, and a power element having pressure engagement with said restraining element to hold the same in firm restraining relation with said screw to hold the screw in a predetermined adjusted position, said restraining element being movable toward said power element to load the same as an incident to the advance of the tappet screw.

12. In a tappet for intermittently actuating the tappet valve of an internal combustion engine, a body having a portion provided with a screw thread, a motion transmitting tappet screw having a screw thread mating with said first-named screw thread to render the tappet screw adjustable longitudinally of the body, a restraining element associated with said motion transmitting tappet screw and a power element responsive to said restraining element, said restraining element and said body being formed with interfitting screw threads of a pitch which moves the restraining element toward the power element concurrently with the advance of the tappet screw to load the power element.

13. In a tappet for intermittently unseating a spring-seated poppet valve of an internal combustion engine, a body having a portion provided with a screw thread, a tappet screw for engaging and unseating a poppet valve and having a screw thread mating with said first-named screw thread to render the tappet screw adjustable lengthwise of the body, and a movable restraining element associated with said tappet screw, said tappet screw and said restraining element having interfitting screw threads of a pitch different from the pitch of said first-named screw threads, and a power element in operative relation to said restraining element and loaded by movement of the restraining element, said power element having means constantly urging said tappet screw in the direction in which the valve spring of the poppet valve acts to seat the valve.

14. In a tappet for intermittently unseating a spring-seated poppet valve of an internal combustion engine, a body having a portion provided with a screw thread, a tappet screw for engaging and unseating a poppet valve and having a screw thread mating with said first-named screw thread to render the tappet screw adjustable lengthwise of the body, a movable restraining element associated with said tappet screw, said tappet screw and said restraining element having interfitting screw threads of a pitch different from the pitch of said first-named screw threads, and a power element in operative relation to said restraining element and loaded by movement of the restraining element, said power element having means constantly urging said tappet screw in the direction in which the valve spring of the valve acts to seat the valve, said body being in steadying relation to said movable restraining element.

15. In a tappet for intermittently unseating a spring-seated poppet valve of an internal combustion engine, a body having a portion provided with a screw thread, a motion transmitting tappet screw for unseating a poppet valve and having a screw thread mating with said first-named screw thread to render the tappet screw adjustable lengthwise of the body, a restraining element associated with said motion transmitting tappet screw, said tappet screw and said restraining element having interfitting screw threads of a pitch different from the pitch of said first-named screw threads, and a power element between said restraining element and said threaded portion of the body and having an expansive force urging said tappet screw in the direction in which the valve spring acts to seat the valve.

IRVING G. QUESADA.